(12) United States Patent
Iwaya

(10) Patent No.: US 11,858,642 B2
(45) Date of Patent: Jan. 2, 2024

(54) CONTAINER FOR FLIGHT CRAFT

(71) Applicant: Iwaya Giken Inc., Sapporo (JP)

(72) Inventor: Keisuke Iwaya, Sapporo (JP)

(73) Assignee: Iwaya Giken Inc.

( * ) Notice: Subject to any disclaimer, the term of this patent is extended or adjusted under 35 U.S.C. 154(b) by 0 days.

(21) Appl. No.: 17/695,978

(22) Filed: Mar. 16, 2022

(65) Prior Publication Data
US 2022/0348303 A1   Nov. 3, 2022

(30) Foreign Application Priority Data

Mar. 19, 2021 (JP) .................................. 2021-046076
Sep. 21, 2021 (JP) .................................. 2021-153605

(51) Int. Cl.
*B64D 13/08* (2006.01)
*B64B 1/22* (2006.01)
*G03B 17/55* (2021.01)

(52) U.S. Cl.
CPC ................ *B64D 13/08* (2013.01); *B64B 1/22* (2013.01); *G03B 17/55* (2013.01)

(58) Field of Classification Search
CPC ........... B64G 1/22; B64D 13/08; H04N 23/51
See application file for complete search history.

(56) References Cited

U.S. PATENT DOCUMENTS

2008/0211958 A1* 9/2008 Berkey ............ G08B 13/19619
                                                    348/E5.026
2013/0242113 A1   9/2013 Tanaka
(Continued)

FOREIGN PATENT DOCUMENTS

JP    H09-043723 A    2/1997
JP    H11-317442 A    11/1999
(Continued)

OTHER PUBLICATIONS

Japanese Office Action for corresponding Japanese Patent Application No. 2021-046076 dated Apr. 20, 2021 including English translation (15 pgs).
(Continued)

*Primary Examiner* — Richard G Davis
(74) *Attorney, Agent, or Firm* — Harness, Dickey & Pierce, P.L.C.

(57) ABSTRACT

The present invention ensures that when condensation forms in a container for a flying object, water from the condensation does not adversely affect an object in the container. Container 12 is a cabin of a gas balloon and comprises Main Body 121, which is an airtight container for accommodating Crew Member H1 and is filled with Air 122, Condensation Promoting Member 123 is made of a material that has a high thermal conductivity, such as aluminum, and is partly exposed to the inside of Main Body 121 and partly exposed to the outside of Main Body 121. Water Collecting Vessel 124 is positioned below the portion of Condensation Promoting Member 123 exposed to the inside of Main Body 121 and collects water from condensation formed on Condensation Promoting Member 123. Conduit 125 directs water collected by Water Collecting Vessel 124 to Water Collection Container 126. Condensation forms on Condensation Promoting Member 123, a temperature of which is lower than that in Main Body 121, and thus condensation does not form on Main Body 121.

12 Claims, 5 Drawing Sheets

(56) References Cited

U.S. PATENT DOCUMENTS

| | | |
|---|---|---|
| 2014/0093757 A1 | 4/2014 | Sakai et al. |
| 2017/0297716 A1* | 10/2017 | Moran ................ F24F 13/222 |
| 2021/0225028 A1 | 7/2021 | Konagai et al. |
| 2021/0237843 A1* | 8/2021 | Slocum .................... B64B 1/40 |

FOREIGN PATENT DOCUMENTS

| | | |
|---|---|---|
| JP | 2003-255456 A | 9/2003 |
| JP | 2005-113011 A | 4/2005 |
| JP | 2005-121339 A | 5/2005 |
| JP | 2005-178896 A | 7/2005 |
| JP | 2007-274288 A | 10/2007 |
| JP | 2010-251677 A | 11/2010 |
| JP | 2011-049623 A | 3/2011 |
| JP | 2012-028974 A | 2/2012 |
| JP | 2013-190756 A | 9/2013 |
| JP | 2014-115432 A | 6/2014 |
| JP | 2014-227116 A | 12/2014 |
| JP | 2017-028039 A | 2/2017 |
| JP | 2017-119528 A | 7/2017 |
| JP | 2019-162929 A | 9/2019 |
| JP | 2019-200081 A | 11/2019 |
| JP | 2020-097345 A | 6/2020 |
| WO | 2013-002359 A1 | 1/2013 |

OTHER PUBLICATIONS

Japanese Office Action for corresponding Japanese Patent Application No. 2021-046076 dated Sep. 7, 2021 including English translation (13 pgs).

Japanese Office Action for corresponding Japanese Patent Application No. 2021-046076 dated May 24, 2022 including English translation (7 pgs).

"Galaxy S II finally to "space" Samsung's "Space Balloon project" starts on Jul. 15", Yoichi Hiraga, ITmedia, online Jul. 14, 2011 (8 pages).

"Nagoya University team starts crowdfunding with VR for spherical images of the universe", NAFT Official Website; http://naft.space/VR Video, Jan. 10, 2017 (5 pages).

"Funassyi holds a live concert in space", online, Dec. 12, 2014 (23 pages).

* cited by examiner

CONTAINER FOR FLIGHT CRAFT

TECHNICAL FIELD

This invention relates to a container for use with a flying object such as a balloon or an airship.

BACKGROUND ART

Known in the art are flying objects such as balloons and airships provided with cabins that act as containers for accommodating humans (crew members). By use of such flying object humans can be transported through air.

Patent Document 1 discloses a flying object equipped with a cabin for accommodating a crew member. Patent Document 1 proposes a manned drone equipped with a main body that accommodates a crew member and is suspended for flight by one or more balloons.

PRIOR ART DOCUMENT

Patent Document

Patent Document 1: JP2020-97345A

SUMMARY OF THE INVENTION

Problem to be Solved by the Invention

The higher an altitude of a flying object from the ground, the lower an ambient temperature generally becomes. When a temperature of a cabin wall of the flying object becomes lower than that of air in the cabin, air in contact with the cabin wall cools and condensation may occur. Condensation is a phenomenon by which water vapor in air cools upon contact with a surface of an object, converts to water and adheres to the surface of the object.

If a part of the cabin wall is a window with a plate that transmits light, formation of condensation on the window impedes an ability of a crew member to see out of the cabin. Moreover, if condensation forms on the cabin wall, water from the condensation may flow and reach an object in the cabin that is susceptible to damage by water, such as an electronic device.

A flying object may also be equipped with an airtight container that houses a device such as a camera device. In such a container, as with the cabin mentioned above, if condensation forms on a wall of the container, water from the condensation may damage the device in the container.

In view of the above circumstances, the present invention provides a means to ensure that even if condensation forms in a container for a flying object, water from the condensation will not adversely affect an object in the container.

Means for Solving the Problem

The present invention includes, as a first aspect, a container for a flying object comprising: a main body that is airtight and contains an object; and a condensation promoting member that is exposed to an inside of the main body, has a higher thermal conductivity than a portion of an inner surface of the main body, and causes condensation to form earlier than on the inner surface of the main body when water vapor in the main body condenses.

The present invention includes, as a second aspect, a container according to the first aspect, comprising: a water storing container that contains the water from condensation formed on the condensation promoting member.

The present invention includes, as a third aspect, a container according to the second aspect, wherein the water storing container acts as a water ballast tank for adjusting an altitude of the flying object.

The present invention includes, as a fourth aspect, a container according to the first aspect, comprising: a drainage mechanism that drains the water from condensation formed on the condensation promoting member out of the main body.

The present invention includes, as a fifth aspect, a container according to the fourth aspect, comprising: a water absorbing material that absorbs the water from the condensation formed on the condensation promoting member.

The present invention includes, as a sixth aspect, a container for a flying object comprising: a main body that is airtight and contains an object; wherein a wall of the main body has a low thermal conductivity portion and a high thermal conductivity portion, the high thermal conductivity portion having a higher thermal conductivity than the low thermal conductivity portion in a direction from inside to outside of the main body, and the high thermal conductivity portion causes condensation to form earlier than on the low thermal conductivity portion when water vapor in the main body condenses.

The present invention includes, as a seventh aspect, a container according to the sixth aspect, wherein the high thermal conductivity portion is made thinner than the low thermal conductivity portion so that the thermal conductivity of the high thermal conductivity portion is higher than the thermal conductivity of the low thermal conductivity portion.

The present invention includes, as an eighth aspect, a container according to the sixth aspect, wherein the main body has a heat insulating material at least in the low thermal conductivity portion, and the high thermal conductivity portion has no heat insulating material or has a heat insulating material that is thinner than the heat insulating material of the low thermal conductivity portion so that the thermal conductivity of the high thermal conductivity portion is higher than the thermal conductivity of the low thermal conductivity portion.

The present invention includes, as a ninth aspect, a container according to the sixth aspect, comprising: a water storing container that contains the water from condensation formed on the high thermal conductivity portion.

The present invention includes, as a tenth aspect, a container according to the ninth aspect, wherein the water storing container acts as a water ballast tank for adjusting an altitude of the flying object.

The present invention includes, as an eleventh aspect, a container according to the sixth aspect, comprising: a drainage mechanism that drains the water from condensation formed on the high thermal conductivity portion out of the main body.

The present invention includes, as a twelfth aspect, a container according to the sixth aspect, comprising: a water absorbing material that absorbs the water from the condensation formed on the high thermal conductivity portion.

The present invention includes, as a thirteenth aspect, a container according to the first aspect or the sixth aspect, wherein the main body is capable of accommodating a human

Effects of Invention

According to the present invention, when condensation forms in the main body, water from the condensation does not adversely affect an object in the main body because the condensation forms on the condensation promoting member or on the high thermal conductivity portion located well away from the object.

MODES FOR CARRYING OUT THE INVENTION

Exemplary Embodiment

Figure 1:
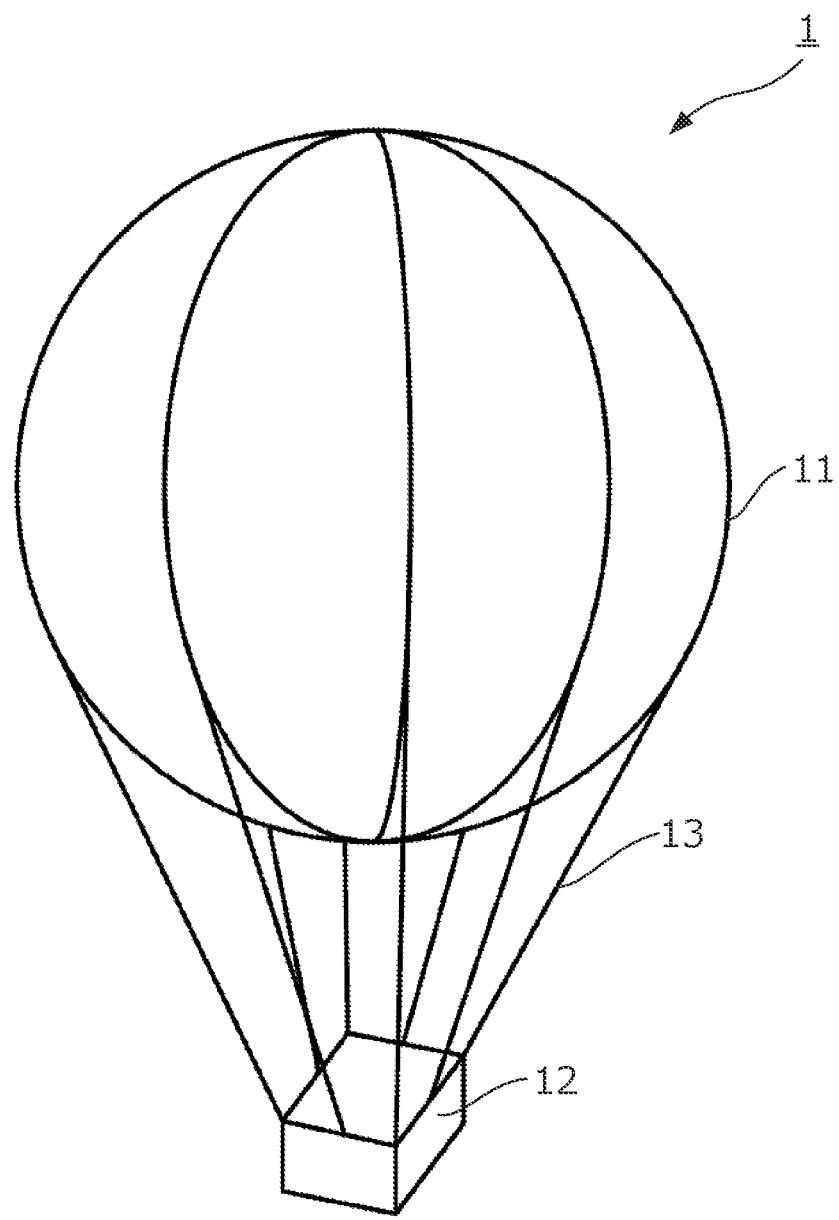
FIG. 1 shows an overall configuration of a flying object according to an exemplary embodiment of the present invention.

FIG. 1 shows an overall configuration of Flying Object 1 according to an exemplary embodiment of the present invention. Flying Object 1 comprises Envelope 11 that contains a lighter-than-air gas such as helium, and Container 12 that is suspended from Envelope 11 via Suspension Ropes 13 and moves in flight with Envelope 11. One end of each Suspension Rope 13 is connected to Envelope 11 and the other end of each Suspension Rope 13 is connected to Container 12.

Figure 2:
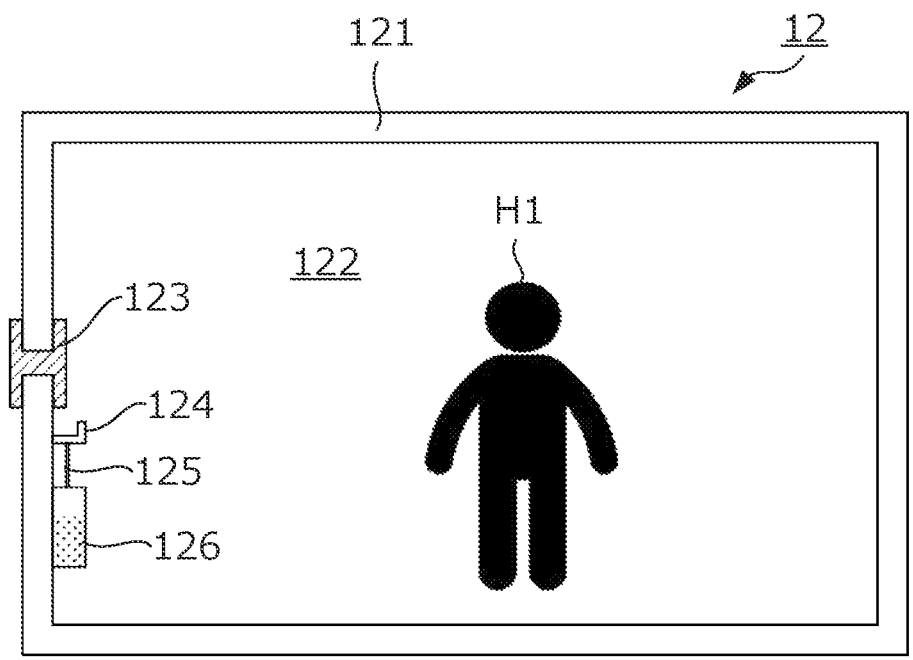
FIG. 2 shows a configuration of a container according to an exemplary embodiment of the present invention.

FIG. 2 shows a configuration of Container 12. Container 12 has Main Body 121, which is a hollow box that is filled with Air 122 and contains an object to be transported by Flying Object 1 such as Crew Member H1, and Condensation Promoting Member 123. Condensation Promoting Member 123 is a member that is partially contained in Main Body 121 and causes condensation of water vapor in Main Body 121 to form earlier than on an inner surface of Main Body 121. Container 12 further comprises Water Collecting Vessel 124 that collects water from condensation formed on Condensation Promoting Member 123, Conduit 125 that directs water collected by Water Collecting Vessel 124 to Water Storing Container 126.

Flying Object 1 is capable of ascending from ground height/level up to high altitudes, for example, up to tens of thousands of meters. During flight of Flying Object 1, Main Body 121 is kept airtight to maintain an interior air pressure and prevent leakage of Air 122 to the exterior. Main Body 121 is equipped with hatches and other facilities for Crew Member H1 to enter and exit prior to and after flight of Flying Object 1. These components are not shown in FIG. 2.

Main Body 121 is made of, for example, fiber-reinforced plastic. The material of Main Body 121 is not limited to fiber-reinforced plastic, but must be sufficiently strong and light weight, and may be, for example, a lightweight metal such as aluminum, a plastic that is not fiber reinforced, or a combination thereof.

Air 122 is a gas containing sufficient oxygen to enable Crew Member H1 to breathe. Main Body 121 is filled with an appropriate amount of Air 122 to maintain an air pressure in Main Body 121 at approximately atmospheric pressure. Air 122 contains water vapor.

Condensation Promoting Member 123 has a higher thermal conductivity than a wall of Main Body 121. A portion of Condensation Promoting Member 123 is exposed to the inside of Main Body 121, and another portion of Condensation Promoting Member 123 is exposed to the outside of Main Body 121. Therefore, a temperature of Condensation Promoting Member 123 decreases faster than that of the wall of Main Body 121, and condensation is caused to form faster than on the wall of the Main Body 121. Condensation Promoting Member 123 is made of, for example, lightweight metal such as aluminum. However, a material of Condensation Promoting Member 123 is not limited to lightweight metal, and may be made of a material that has a higher thermal conductivity than that of the wall of Main Body 121

Water Collecting Vessel 124 is located below the portion of Condensation Promoting Member 123 that is exposed to the inside of Main Body 121. Water Collecting Vessel 124 collects water from condensation formed on the portion of Condensation Promoting Member 123 that is exposed to the inside of Main Body 121 and flows down. Water Collecting Vessel 124 has a through hole, and water flowing through the hole moves through Conduit 125 into Water Collecting Container 126. Water Storing Container 126 is a container that contains water falling from Water Collecting Vessel 124. Water contained in Water Storing Container 126 is usually discarded after Flying Object 1 returns to the ground. However, water contained in Water Storing Container 126 may be used, for example, when water in Main Body 121 becomes scarce.

According to the above-described Container 12, when condensation forms in Main Body 121, the condensation forms on Condensation Promoting Member 123, and formation of condensation on the wall of Main Body 121 is suppressed. Water generated in Condensation Promoting Member 123 is held by Water Container 126 and does not come into contact with surrounding objects. As a result, water from condensation does not adversely affect objects contained in Container 12.

[Modifications]

The above-described Flying Object 1 is of an exemplary embodiment of the present invention, and may be modified in various ways. Following are examples of modifications of the above-described embodiment. Two or more of the above-described embodiments and the following modifications may be combined.

(1) In Flying Object 1 of the above-described embodiment, Water Storing Container 126 that contains water from condensation in Condensation Promoting Member 123 is located inside Main Body 121. However, a location of Water Storing Container 126 is not limited to the inside of Main Body 121.

Figure 3:
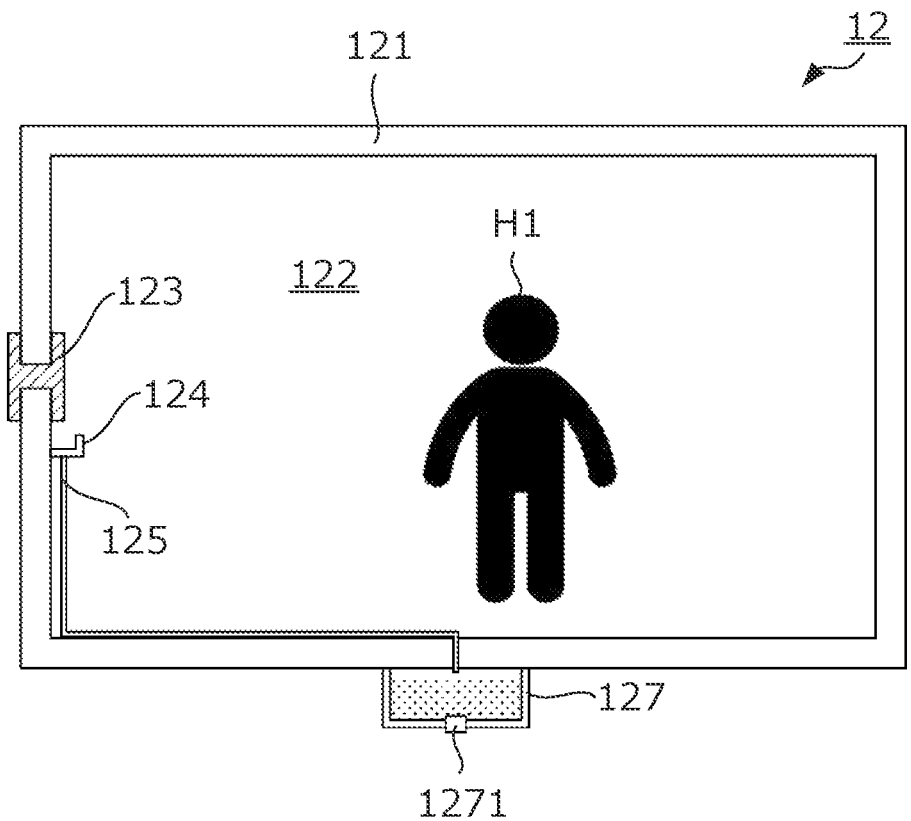
FIG. 3 shows a configuration of a container according to a modification of the exemplary embodiment of the present invention.

FIG. 3 shows a configuration of Container 12 according to this modification. Container 12 in FIG. 3 has Ballast Tank 127 located outside of Main Body 121 instead of Water Storing Container 126. Ballast Tank 127 is a tank that contains ballast water to adjust an altitude of Flying Object 1. Ballast Tank 127 has an opening for draining ballast water to the outside of Ballast Tank 127 and Valve 1271 that opens and closes the opening.

Valve 1271 opens and closes, for example, according to control signals transmitted either wirelessly or by wire from a communication terminal device (not shown in FIG. 3) operated by Crew Member H1. Alternatively, Container 12 may comprise a valve opening/closing mechanism (not shown in FIG. 3) that keeps Valve 1271 open while, for example, an operating cable of the valve opening/closing mechanism is pulled by Crew Member H1, and keeps Valve 1271 closed while the operating cable is not pulled by Crew Member H1. In this case, Water Collecting Vessel 124, Conduit 125, Valve 1271, and the valve opening/closing mechanism constitute an example of a drainage mechanism that drains water from condensation formed on Condensation Promoting Member 123 out of Main Body 121.

In Container 12 shown in FIG. 3, water from condensation in Condensation Promoting Member 123 falls into Water Collecting Vessel 124, is collected by Water Collecting Vessel 124, and flows through Conduit 125 into Ballast Tank 127 to become part of ballast water. When Valve 1271 is opened, for example, in response to an operation of Crew Member H1, the water from condensation is discharged as ballast water to the outside of Ballast Tank 127, i.e., outside of Container 12.

In Container 12 shown in FIG. 3, Ballast Tank 127 serves as Water Storing Container 126. Alternatively, Water Storing Container 126 that does not serve as Ballast Tank 127 may be located outside of Main Body 121. Container 12 need not have Water Storing Container 126, and water from condensation formed on Condensation Promoting Member 123 may be directed to the outside of the Main Body 121 by Conduit 125. In this case, Container 12 may have a valve that restricts a flow of water in Conduit 125 and a valve open/close mechanism that opens and closes the valve, for example, in response to an operation of Crew Member H1. In this case, Water Collecting Vessel 124, Conduit 125, the valve, and the valve opening/closing mechanism constitute an example of a drainage mechanism that drains water from condensation formed on Condensation Promoting Member 123 out of the Main Body 121.

(2) Water from condensation formed on Condensation Promoting Member 123 may be absorbed by a water absorbing material instead of being contained in Water Storing Container 126 or drained out of Main Body 121.

Figure 4:
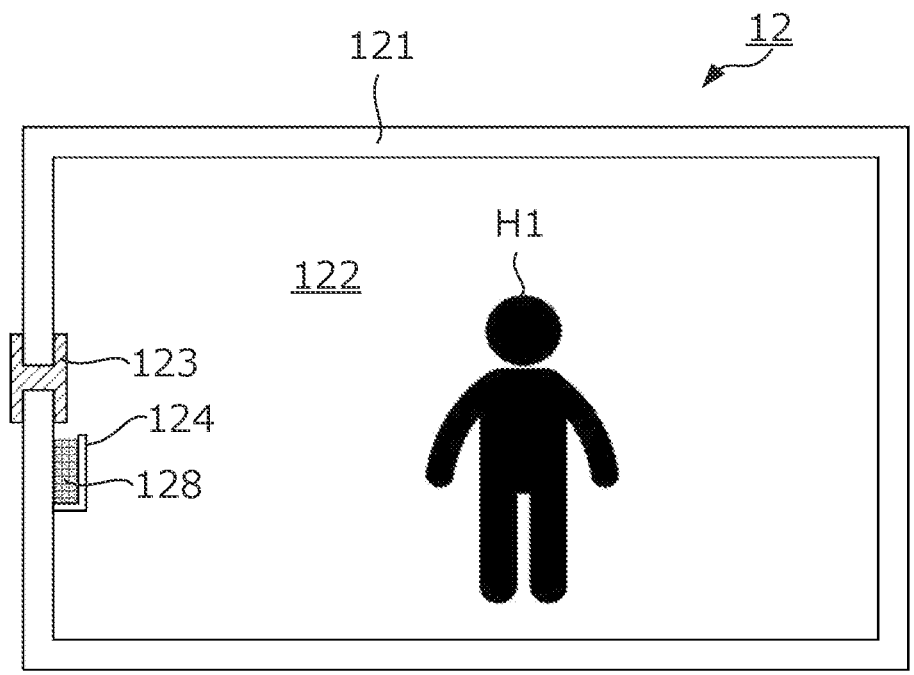
FIG. 4 shows a configuration of a container according to a modification of the exemplary embodiment of the present invention.

FIG. 4 shows a configuration of Container 12 according to this modification. Container 12 shown in FIG. 4 does not have Conduit 125 and Water Storing Container 126. Water Collecting Vessel 124 of Container 12 in FIG. 4 does not have a drain, but is provided with Water Absorbing Material 128. Water Absorbing Material 128 is a material that absorbs water and becomes gelatinous or solid as a result. For example, water absorbing polymers may be used as Water Absorbing Material 128.

According to Container 12 of this modification, water from condensation formed on Condensation Promoting Member 123 is absorbed by Water Absorbing Material 128 and does not come into contact with objects in Main Body 121. Therefore, the objects in Main Body 121 are not adversely affected by water from condensation.

(3) According to Container 12 in the above-described embodiment, Condensation Promoting Member 123, which is a different member from the Main Body 121, is provided on the inner surface of the wall of Main Body 121 to prevent condensation forming on the inner surface of the Main Body 121, when condensation forms in Main Body 121.

Alternatively, the wall of the Main Body 121 may have a low thermal conductivity portion as well as a high thermal conductivity portion that has a thermal conductivity higher than that of the low thermal conductivity portion in a direction inside to outside of Main Body 121. In this case, the high thermal conductivity portion performs the same function as Condensation Promoting Member 123. Namely, condensation forms earlier on the high thermal conductivity portion than on the low thermal conductivity portion when condensation forms in Main Body 121.

Figure 5:
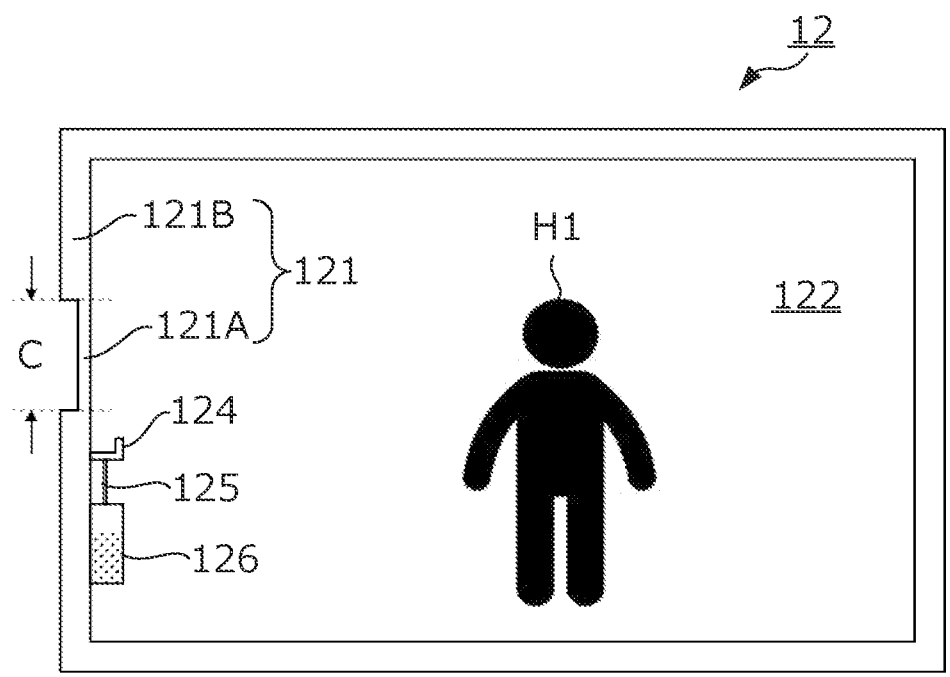
FIG. 5 shows a configuration of a container according to a modification of the exemplary embodiment of the present invention.

FIG. 5 shows a configuration of Container 12 according to this modification. Container 12 in FIG. 5 does not have Condensation Promoting Member 123. Main Body 121 of Container 12 in FIG. 5 is divided into High Thermal Conductivity Portion 121A (indicated as Range C in FIG. 5) and Low Thermal Conductivity Portion 121B. Since High Thermal Conductivity Portion 121A is thinner than Low Thermal Conductivity Portion 121B, a thermal conductivity in a direction from inside to outside of Main Body 121 is higher in High Thermal Conductivity Portion 121A than in Low Thermal Conductivity Portion 121B. Therefore, a temperature of High Thermal Conductivity Portion 121A decreases faster than that of Low Thermal Conductivity Portion 121B during flight of Flying Object 1, and a temperature outside of Container 12 is lower than that inside of Container 12. As a result, when condensation forms in Main Body 121, condensation forms faster on High Thermal Conductivity Portion 121A than on Low Thermal Conductivity Portion 121B.

According to Container 12 shown in FIG. 5, water from condensation in High Thermal Conductivity Portion 121A is absorbed by Water Absorbing Material 128 provided in Water Collecting Vessel 124. Alternatively, water from condensation in High Thermal Conductivity Portion 121A may be contained in Water Storing Container 126 or Ballast Tank 127. Further, water from condensation in High Thermal Conductivity Portion 121A may be drained out of Main Body 121, either by passing through Ballast Tank 127 or without passing through Ballast Tank 127.

Figure 6:
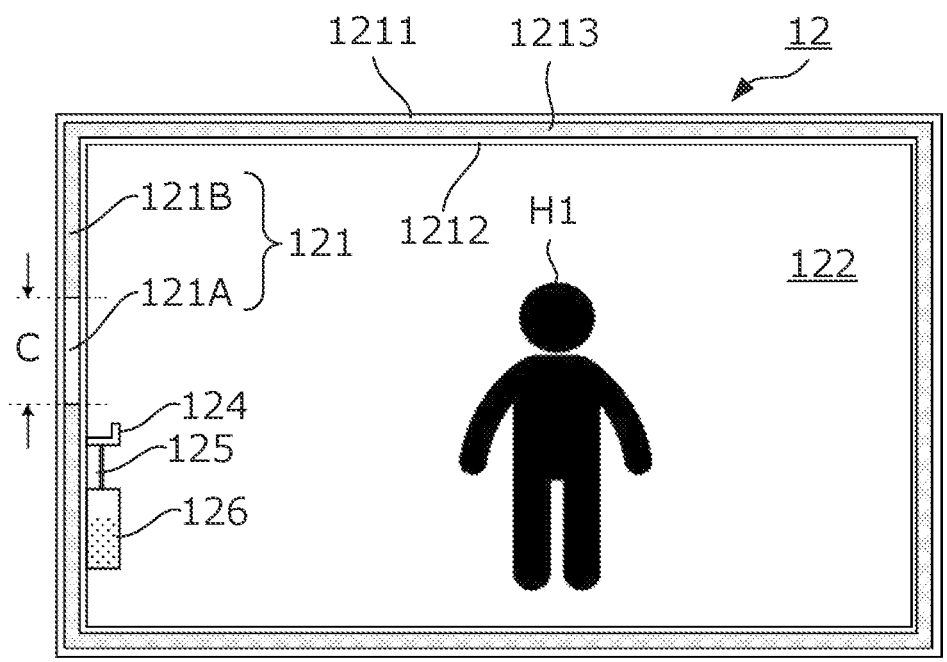
FIG. 6 shows a configuration of a container according to a modification of the exemplary embodiment of the present invention.

FIG. 6 shows a configuration of Container 12 according to another example of this modification. Main Body 121 of Container 12 in FIG. 6 has Outer Wall 1211, Inner Wall 1212, and Heat Insulating Material 1213 provided between them. Heat Insulating Material 1213 is a material that has a lower thermal conductivity than Outer Wall 1211 and Timer Wall 1212 in a direction from inside to outside of Main Body 121.

In Container 12 shown in FIG. 6, Heat Insulating Material 1213 is not provided between Outer Wall 1211 and Timer Wall 1212 of High Thermal Conductivity Portion 121A indicated as Range C. Therefore, High Thermal Conductivity Portion 121A has a higher thermal conductivity than Low Thermal Conductivity Portion 121B, and a temperature of High Thermal Conductivity Portion 121A decreases faster than a temperature of Low Thermal Conductivity Portion 121B when the outside of Main Body 121 is cooler than the inside of Main Body 121. As a result, when condensation forms in Main Body 121, condensation forms faster on High Thermal Conductivity Portion 121A than on Low Thermal Conductivity Portion 121B.

In Container 12 shown in FIG. 6, High Thermal Conductivity Portion 121A is not provided with Heat Insulating Material 1213. Alternatively, High Thermal Conductivity Portion 121A may be provided with Heat Insulating Material 1213 that is thinner than Heat Insulating Material 1213 of Low Thermal Conductivity Portion 121B.

Figure 7:
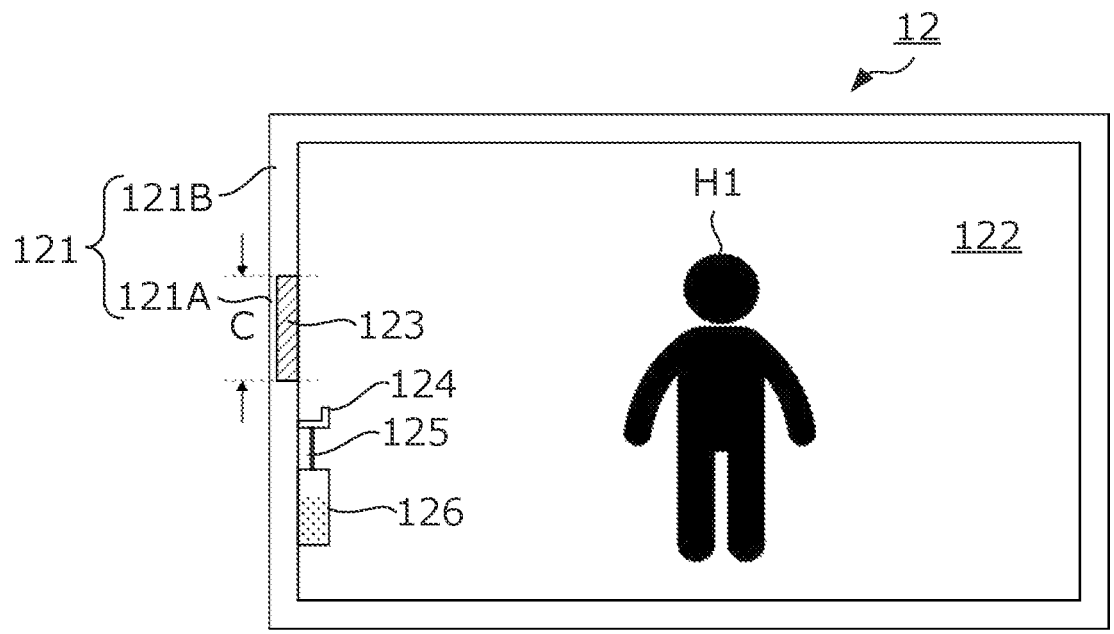
FIG. 7 shows a configuration of a container according to a modification of the exemplary embodiment of the present invention.

FIG. 7 shows a configuration of Container 12 according to another example of this modification. Main Body 121 of Container 12 shown in FIG. 7 has Condensation Promoting Member 123, which forms a part of Main Body 121, exposed to the inside of Main Body 121 in High Thermal Conductivity Portion 121A indicated as Range C. In FIG. 7, only a part of High Thermal Conductivity Portion 121A in a direction from inside to outside of Main Body 121 is formed of Condensation Promoting Member 123. Alternatively, the entirety of High Thermal Conductivity Portion 121A may be formed of Condensation Promoting Member 123.

Figure 8:
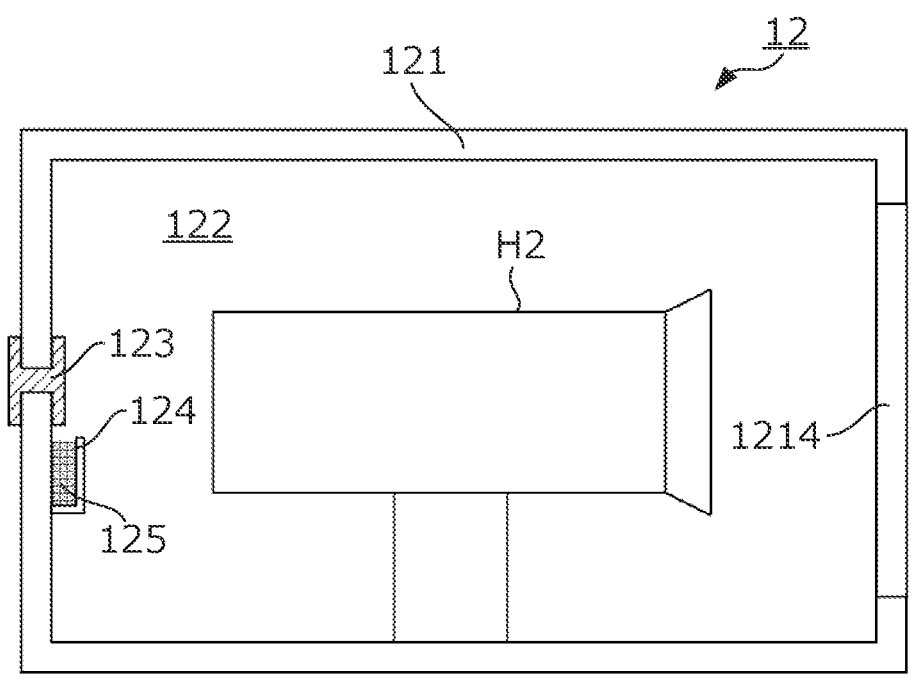
FIG. 8 shows a configuration of a container according to a modification of the exemplary embodiment of the present invention.

(4) In the embodiment described above, Main Body 121 of Container 12 is a cabin that accommodates a human. Main Body 121 need not accommodate a human. FIG. 8 shows Main Body 121 containing Camera Device H2.

In this modification, an opening is provided in the side wall of Main Body 121. The opening covers a shooting area (angle of view) of Camera Device H2. Light-Transmitting Panel 1214 seals the opening. Camera Device H2 senses light entering through Light-Transmitting Panel 1214 and captures images.

In the example in FIG. 8, as with Container 12 in the above-described embodiment, Condensation Promoting Member 123 has a higher thermal conductivity than the wall of Main Body 121 including Light-Transmitting Panel 1214. Therefore, when water vapor in Main Body 121 condenses, condensation forms on Condensation Promoting Member 123 earlier than on the wall of Main Body 121. As a result, for example, condensation does not form on Light-Transmitting Panel 1214, and thus when Camera Device H2 captures images of the outside of Main Body 121 through Light-Transmitting Panel 1214, water interference does not occur when focusing images, or as presence of water droplets in captured images, etc.

(5) Container 12 need not have a mechanism to contain water from condensation formed on Condensation Promoting Member 123. For example, unlike Container 12 according to the above-described embodiment, Container 12 need not have Water Collecting Vessel 124, Conduit 125, and Water Storing Container 126. In such a case, water from condensation formed on Condensation Promoting Member 123 may fall to the floor of Main Body 121 and flow across the floor. However, if no object that would be adversely affected by contact with water is located within the area where water flow occurs, such water flow is not problematic.

(6) In the above-mentioned embodiment, Flying Object 1 is a gas balloon, but the type of Flying Object 1 is not limited to a gas balloon, and Flying Object 1 may be any other type of flying object such as a thermal balloon and an airship.

DESCRIPTION OF REFERENCE NUMERALS

1: Flying Object
11: Envelope
12: Container
13: Suspension Ropes
121: Main Body
122: Air
123: Condensation Promoting Member
124: Water Collecting Vessel
125: Conduit
126: Water Storing Container
127: Ballast Tank
128: Water Absorbing Material
1211: Outer Wall
1212: Inner Wall
1213: Heat Insulating Material
1214: Light-Transmitting Panel
1271: Valve

The invention claimed is:

1. A container for a flying object comprising:
a main body that is airtight and contains an object;
wherein
a wall of the main body has a low thermal conductivity portion and a high thermal conductivity portion, the high thermal conductivity portion having a higher thermal conductivity than the low thermal conductivity portion,
when a temperature outside of the container is lower than a temperature inside of the container, a temperature of the high thermal conductivity portion decreases faster than a temperature of the low thermal conductivity portion, and the high thermal conductivity portion causes condensation to form earlier than on the low thermal conductivity portion when water vapor in the main body condenses,
the high thermal conductivity portion is made thinner than the low thermal conductivity portion so that the thermal conductivity of the high thermal conductivity portion is higher than the thermal conductivity of the low thermal conductivity portion.

2. A container according to claim 1, comprising:
a water storing container that contains the water from condensation formed on the high thermal conductivity portion.

3. A container according to claim 2, wherein
the water storing container acts as a water ballast tank for adjusting an altitude of the flying object.

4. A container according to claim 1, comprising:
a drainage mechanism that drains the water from condensation formed on the high thermal conductivity portion out of the main body.

5. A container according to claim 1, comprising:
a water absorbing material that absorbs the water from the condensation formed on the high thermal conductivity portion.

6. A container according to claim 1, wherein
the main body is capable of accommodating a human.

7. A container for a flying object comprising:
a main body that is airtight and contains an object;
wherein
a wall of the main body has a low thermal conductivity portion and a high thermal conductivity portion, the high thermal conductivity portion having a higher thermal conductivity than the low thermal conductivity portion,
when a temperature outside of the container is lower than a temperature inside of the container, a temperature of the high thermal conductivity portion decreases faster than a temperature of the low thermal conductivity portion, and the high thermal conductivity portion causes condensation to form earlier than on the low thermal conductivity portion when water vapor in the main body condenses,
the main body has a heat insulating material at least in the low thermal conductivity portion, and
the high thermal conductivity portion has no heat insulating material or has a heat insulating material that is thinner than the heat insulating material of the low thermal conductivity portion so that the thermal conductivity of the high thermal conductivity portion is higher than the thermal conductivity of the low thermal conductivity portion.

8. A container according to claim 7, comprising:
a water storing container that contains the water from condensation formed on the high thermal conductivity portion.
9. A container according to claim 8, wherein
the water storing container acts as a water ballast tank for adjusting an altitude of the flying object.
10. A container according to claim 7, comprising:
a drainage mechanism that drains the water from condensation formed on the high thermal conductivity portion out of the main body.
11. A container according to claim 7, comprising:
a water absorbing material that absorbs the water from the condensation formed on the high thermal conductivity portion.
12. A container according to claim 7, wherein
the main body is capable of accommodating a human.

* * * * *